(12) United States Patent
Ito et al.

(10) Patent No.: US 12,113,941 B2
(45) Date of Patent: Oct. 8, 2024

(54) INFORMATION PROCESSING METHOD, SCANNING APPARATUS, AND NON-TRANSITORY COMPUTER-READABLE MEDIA FOR TRANSMITTING IMAGE DATA IN A VIRTUAL SPACE

(71) Applicant: CANON KABUSHIKI KAISHA, Tokyo (JP)

(72) Inventors: Chie Ito, Chiba (JP); Takuya Ushinohama, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/363,577

(22) Filed: Aug. 1, 2023

(65) Prior Publication Data
US 2024/0048659 A1 Feb. 8, 2024

(30) Foreign Application Priority Data

Aug. 4, 2022 (JP) ................................. 2022-124675

(51) Int. Cl.
*H04N 1/00* (2006.01)
*G06T 19/00* (2011.01)
*H04N 1/32* (2006.01)

(52) U.S. Cl.
CPC ......... *H04N 1/00225* (2013.01); *G06T 19/00* (2013.01); *H04N 1/00233* (2013.01); *H04N 1/00244* (2013.01); *H04N 1/32101* (2013.01); *G06T 2219/024* (2013.01); *H04N 2201/0074* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2021/0144266 A1* | 5/2021 | Tsukada | H04N 1/00244 |
| 2021/0409556 A1* | 12/2021 | Ushinohama | H04N 1/00212 |
| 2022/0070066 A1 | 3/2022 | Tokuchi | |

FOREIGN PATENT DOCUMENTS

JP 2022042227 A 3/2022

* cited by examiner

*Primary Examiner* — Thomas D Lee
(74) *Attorney, Agent, or Firm* — Canon U.S.A., Inc. IP Division

(57) ABSTRACT

An information processing method according to an exemplary embodiment of the present disclosure transmits identification information of a virtual space to a scanning apparatus based on a scan instruction input in the virtual space, scans a document to generate image data, transmits the identification information and the image data to an information processing apparatus that provides a service for sharing information in the virtual space, and executes processing for displaying an object based on the transmitted image data in the virtual space corresponding to the identification information.

15 Claims, 13 Drawing Sheets

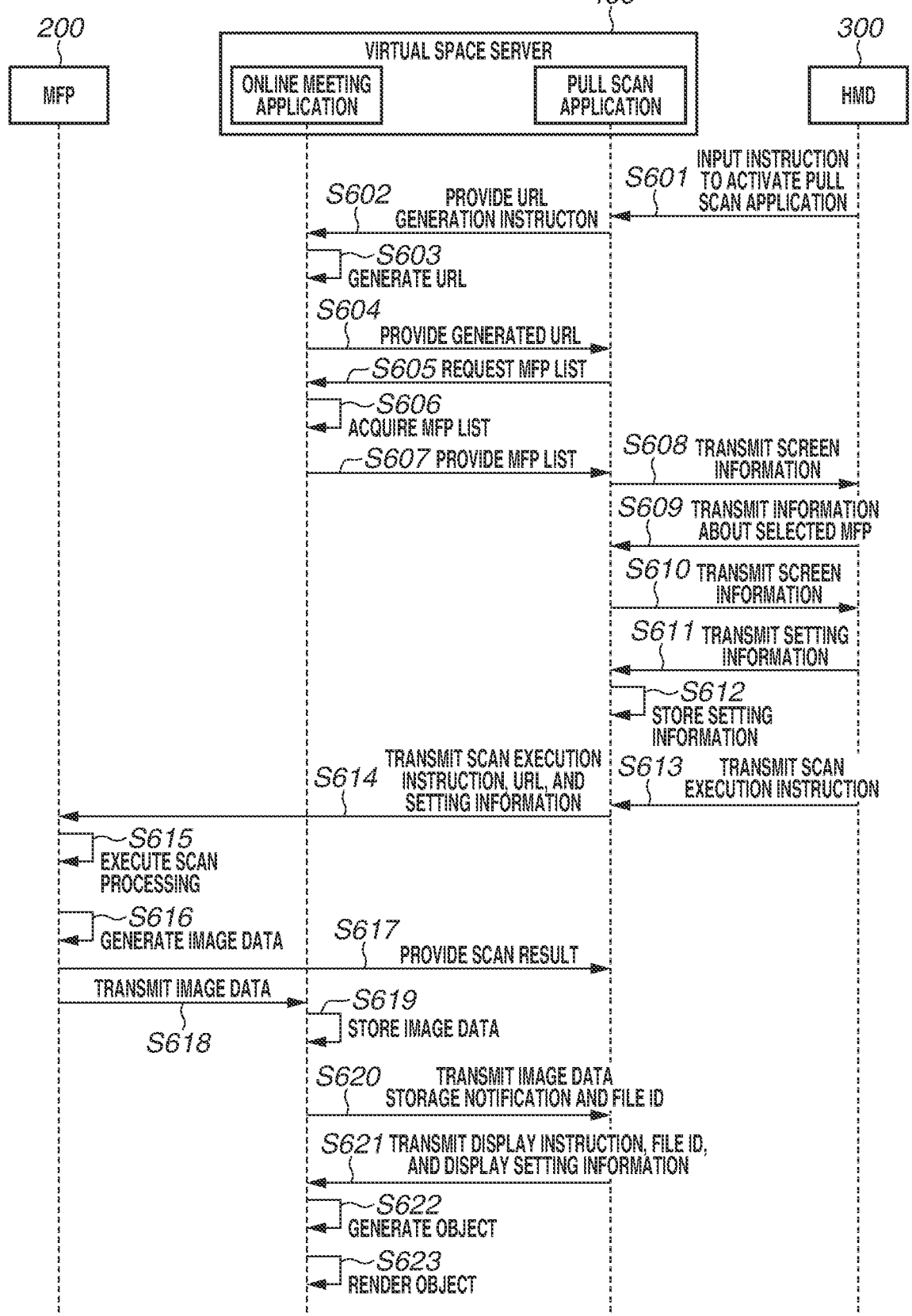

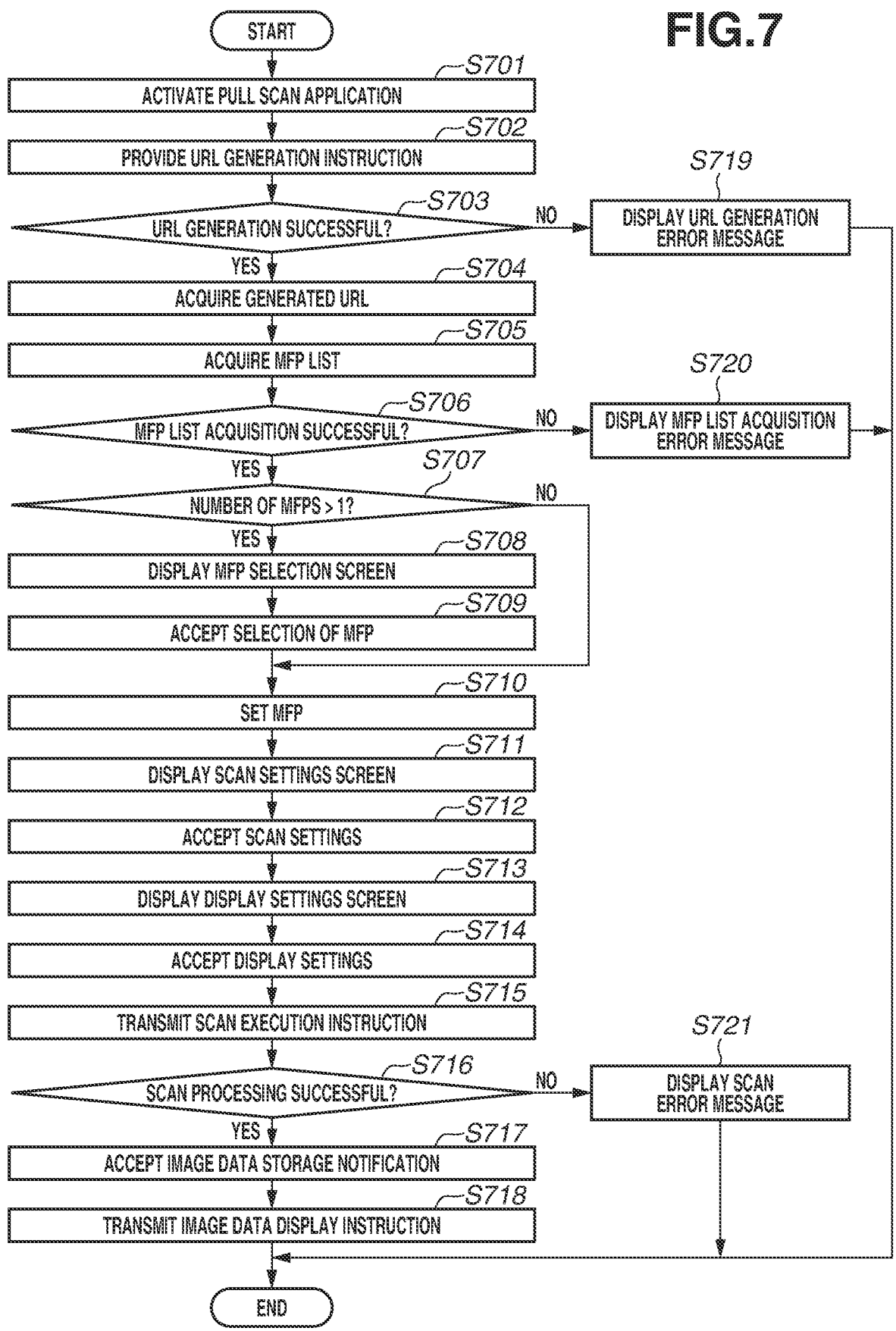

FIG.9A 901

```
AVATAR SELECTION
  ☑ AVATAR A
  ☑ AVATAR B
  ☐ AVATAR C
  ☐ AVATAR D
                    OK  —902
```

FIG.9B 903

```
OBJECT SELECTION
  ☑ WHITE BOARD
  ☑ DESKTOP WHITE BOARD
  ☐ WALLPAPER
  ☐ DISPLAY
                    OK  —904
```

FIG.9C 905

```
SPACE SELECTION
  ☑ CENTER OF MEETING ROOM
  ☐ FRONT RIGHT OF DESK
  ☐ FRONT LEFT OF DESK
  ☐ DESIGNATION BY CONTROLLER
                    OK  —906
```

FIG.10A *1001*

SCALE SETTING

☑ AUTO

☐ 100%

☐ 50%

CUSTOM DESIGNATION >

AUDIO SETTING

☑ WHEN OBJECT IS DISPLAYED — *1004*

SOUND SELECTION >

SOUND VOLUME SELECTION >

AVATAR DESIGNATION >

VISUAL EFFECT SETTING

☑ WHEN OBJECT IS DISPLAYED — *1007*

SLIDE IN

ZOOM

TURN

OK — *1008*

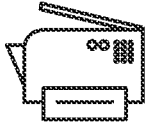

INFORMATION PROCESSING METHOD, SCANNING APPARATUS, AND NON-TRANSITORY COMPUTER-READABLE MEDIA FOR TRANSMITTING IMAGE DATA IN A VIRTUAL SPACE

BACKGROUND

Field of the Disclosure

The present disclosure relates to an information processing method, a scanning apparatus, and non-transitory computer-readable media.

Description of the Related Art

Japanese Patent Application Laid-Open No. 2022-42227 discusses a technique in which a plurality of users exchange information, such as sound and images, in an online meeting service in a virtual space created by virtual reality (VR) technology.

To post, on the online meeting service in the virtual space, image data generated by a scanning apparatus scanning a document, the image data is transmitted from the scanning apparatus to a personal computer (PC) first and then is posted from the PC to the online meeting service, which takes time and effort.

SUMMARY

Some embodiments of the present disclosure are directed to reducing time and effort of a user in a case where image data generated by a scan is shared in a service for sharing information in a virtual space.

According to an aspect of the present disclosure, an information processing method includes performing first transmission to transmit identification information of a virtual space to a scanning apparatus based on a scan instruction input in the virtual space, scanning a document to generate image data, performing second transmission to transmit the identification information and the generated image data to an information processing apparatus that provides a service for sharing information in the virtual space, and executing processing for displaying an object based on the transmitted image data in the virtual space corresponding to the identification information transmitted in the second transmission.

Further features of various embodiments will become apparent from the following description of exemplary embodiments with reference to the attached drawings.

BRIEF DESCRIPTION OF THE DRAWINGS

FIG. 6 is a diagram illustrating an example of a sequence of pull scan processing to be executed from a virtual space based on virtual reality (VR) technology.

FIG. 7 is a flowchart illustrating an example of processing to be executed by a pull scan application.

FIGS. 9A to 9C are diagrams each illustrating an example of a display position selection screen of the pull scan application.

FIGS. 10A to 10C are diagrams each illustrating an example of an effect selection screen of the pull scan application.

FIG. 11 is a diagram illustrating an example of a confirmation window of the pull scan application.

DESCRIPTION OF THE EMBODIMENTS

Exemplary embodiments of the present disclosure will be described in detail below with reference to the drawings. The following exemplary embodiments are not intended to limit every embodiment according to the scope of claims, and not all of the combinations of features described in the exemplary embodiments are essential to every embodiment.

Figure 1:
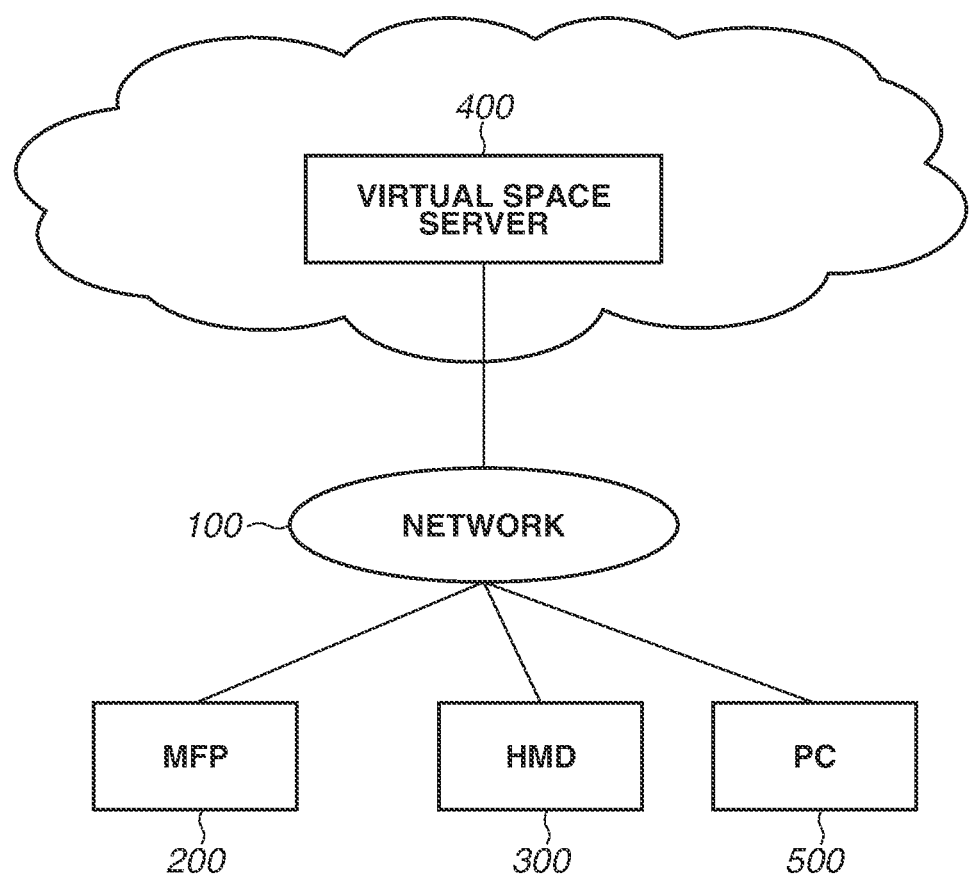
FIG. 1 is a diagram illustrating an example of a system configuration.

FIG. 1 illustrates an example of a system configuration according to an exemplary embodiment of the present disclosure. In an image processing system illustrated in FIG. 1, a virtual space server 400, which is an information processing apparatus, and a multifunction peripheral (MFP) 200, which is an image processing apparatus or a scanning apparatus, are connected to each other via a network 100. In the image processing system, a head mounted display (HMD) 300, which is a terminal apparatus or a display apparatus, and a personal computer (PC) 500, which is a terminal apparatus or an information processing apparatus, are also connected. The PC 500 can be a game machine or the like. The virtual space server 400 provides a virtual space based on virtual reality (VR) technology. The virtual space server 400 renders objects to be displayed in the virtual space and also performs management of users participating in the virtual space and contents. The HMD 300 is a display to be worn by a user. While the HMD 300 is used in the present exemplary embodiment, the present exemplary embodiment is not limited thereto, and a goggle type display, a glass type display, or a contact lens type display can be used. A user performs registration and authentication of user information for the virtual space server 400 by operating the PC 500 or the HMD 300. The network 100 can be the Internet to which the MFP 200 and the virtual space server 400 are each connected, or can be a network in an organization, such as an intranet. The virtual space server 400 can be configured by one information processing apparatus, or a plurality of information processing apparatuses can execute processing of the virtual space server 400 in cooperation with each other.

The HMD 300 accesses the virtual space server 400 to display a virtual space generated by the virtual space server 400, which is a stereoscopic space including a three-dimensional (3D) object, so that the space can be recognized by a person. The object in the virtual space displayed by the HMD 300 can be an object rendered by the virtual space server 400 or an object rendered by the HMD 300. In a case where the HMD 300 connects to the virtual space server 400 via the PC 500, the PC 500 can render the object.

Figure 2:
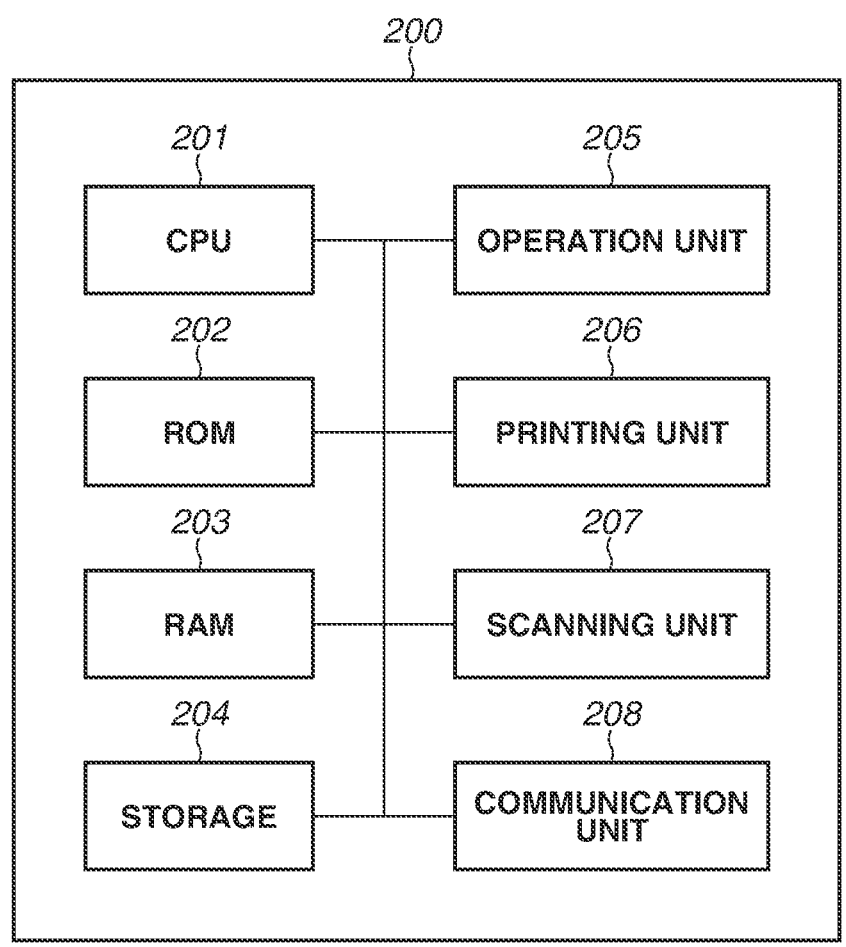
FIG. 2 is a block diagram illustrating an example of a hardware configuration of a multifunction peripheral (MFP).

FIG. 2 illustrates an example of a hardware configuration of the MFP 200. The MFP 200 includes a central processing unit (CPU) 201, a read only memory (ROM) 202, a random access memory (RAM) 203, a storage 204, an operation unit 205, a printing unit 206, a scanning unit 207, and a communication unit 208. The CPU 201 controls an entire operation of the MFP 200. The CPU 201 loads control programs stored in the ROM 202 or the storage 204 into the RAM 203, and performs various kinds of control such as scanning control and printing control. The ROM 202 stores the control programs executable by the CPU 201. The RAM 203 is a main memory, and used as a work area and a temporary storage area for loading various control programs stored in the ROM 202 and the storage 204. The storage 204 stores image data, print data, various programs, and various kinds of setting information. In the present exemplary embodiment, a flash memory is used as the storage 204, but an auxiliary storage device, such as a solid state drive (SSD) or a hard disc drive (HDD), can be used instead. An embedded multimedia card (eMMC) can also be used as the storage 204. In the MFP 200 according to the present exemplary embodiment, one CPU 201 uses one RAM 203 to execute each processing in the flowchart to be described below, but the present exemplary embodiment is not limited thereto. For example, each processing in the flowchart to be described below can be executed by using a plurality of CPUs, RAMs, ROMs, and storages in cooperation. Also, a part of the processing can be executed by using a hardware circuit, such as an application specific integrated circuit (ASIC) or a field programmable gate array (FPGA).

The operation unit 205 includes a display unit, such as a touch panel, and hardware keys. The operation unit 205 displays information to a user and also accepts input from the user.

The printing unit 206 prints an image based on image data (print data) stored in the RAM 203, on a recording sheet fed from a sheet feeding cassette. The scanning unit 207 scans an image of a document to generate image data. The image data generated based on the image scanned by the scanning unit 207 is transmitted to an external apparatus or printed on a recording sheet. The scanning unit 207 generates image data by scanning a document placed on a platen glass (not illustrated) using a sensor, such as a contact image sensor (CIS). The scanning unit 207 also includes an auto document feeder (ADF) (not illustrated) and can generate one or more pieces of image data by conveying one or more sheets of a document placed in a document tray of the ADF and scanning the image(s) of the conveyed sheet(s) using a sensor, such as a CIS. To scan images of a document using the ADF, the user inputs one scan instruction and the MFP 200 accepts the scan instruction, so that a plurality of sheets of the document can be conveyed and the conveyed plurality of sheets can be scanned. In a case where two sheets of a document are scanned, two pieces of image data (two files) can be generated, or one file of two pages can be generated.

The communication unit 208 is a network interface (I/F) for connection to the network 100. The communication unit 208 transmits the image data to an external apparatus on the network 100 and also receives print data from a terminal apparatus. Data transmission and reception via the network 100 can be performed by e-mail, or can be file transmission using another protocol (e.g., File Transfer Protocol (FTP), Server Message Block (SMB), or Web Distributed Authoring and Versioning (WebDAV)). Image data and various kinds of setting data can also be transmitted and received via the network 100 by access from the PC 500 using Hypertext Transfer Protocol (HTTP) communication.

Figure 3:
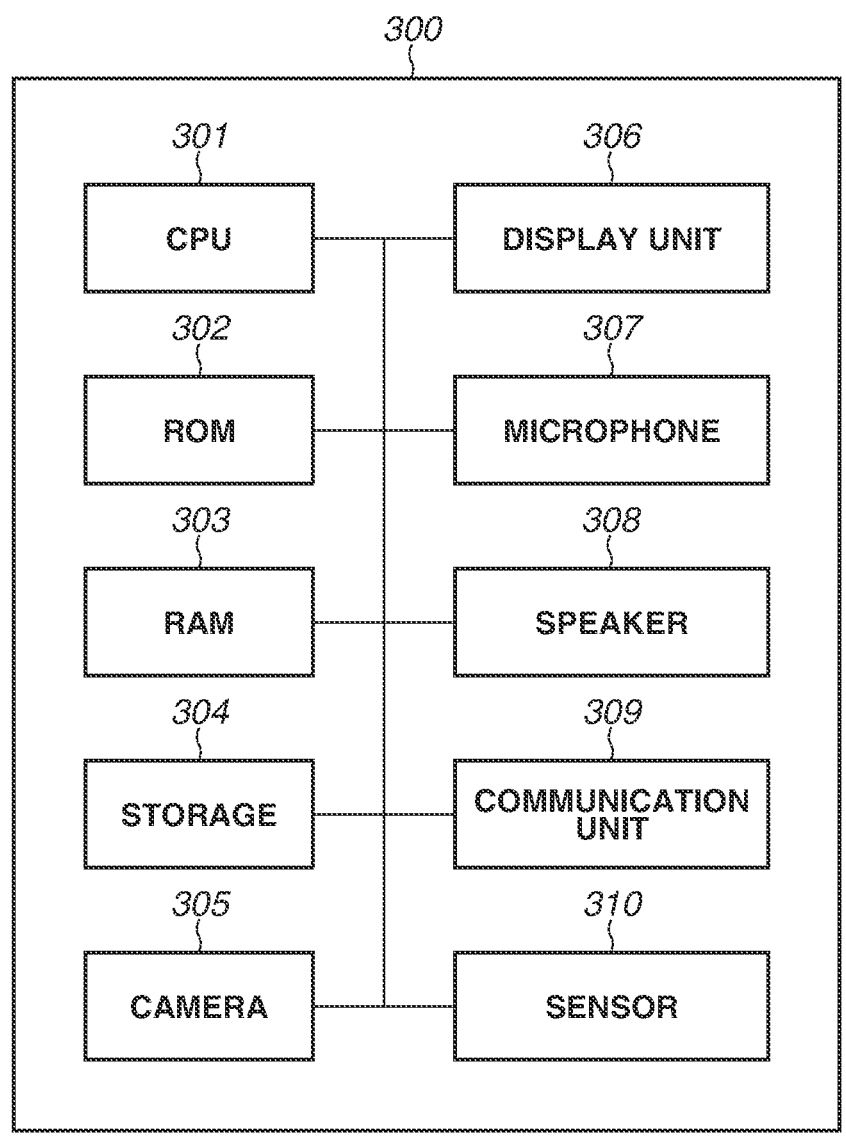
FIG. 3 is a block diagram illustrating an example of a hardware configuration of a head mounted display (HMD).

FIG. 3 illustrates an example of a hardware configuration of the HMD 300. The HMD 300 includes a CPU 301, a ROM 302, a RAM 303, a storage 304, a camera 305, a display unit 306, a microphone 307, a speaker 308, a communication unit 309, and a sensor 310. The CPU 301 controls an entire operation of the HMD 300. The CPU 301 loads control programs stored in the ROM 302 or the storage 304 into the RAM 303, and executes various kinds of processing for controlling the operation of the HMD 300. The ROM 302 stores the control programs executable by the CPU 301. The RAM 303 is a main memory and is used as a work area and a temporary storage area for loading various control programs stored in the ROM 302 and the storage 304. The storage 304 stores application data, various programs, and various kinds of setting information. In the present exemplary embodiment, a flash memory is used as the storage 304, but an auxiliary storage device, such as an SSD or an HDD, can be used instead. The camera 305 is an imaging apparatus that acquires image data by imaging the surrounding environment using an image sensor that converts light into an electrical signal.

The display unit 306 is a display device including a liquid crystal panel. The display unit 306 also includes a lens for correcting distortion of a video image displayed on the liquid crystal panel. The user can watch a video image or an image with no distortion by viewing the liquid crystal panel via the lens. The liquid crystal panel of the display unit 306 can be one sheet or a plurality of sheets.

The display unit 306 displays video data or image data processed by the CPU 301 or displays video data or image data input via the camera 305.

The microphone 307 converts sound into audio data, and the speaker 308 outputs audio data or outputs sound signals processed by the CPU 301.

The communication unit 309 transmits and receives data to and from the virtual space server 400, the PC 500, and the MFP 200 via the network 100. The sensor 310 is a group of sensors, such as a position sensor and an acceleration sensor. A video image or an image displayed on the display unit 306 is switched to another one based on a signal value obtained by the sensor 310. For example, while a user wearing the HMD 300 accesses a virtual space, when the user turns their face to the left, the video image or image displayed on the display unit 306 is switched to another one. In other words, a video image or an image at another angle is displayed to correspond to the viewpoint of the user. The configuration illustrated in FIG. 3 is merely an example, and some of the components may not be included in the HMD 300.

Figure 4:
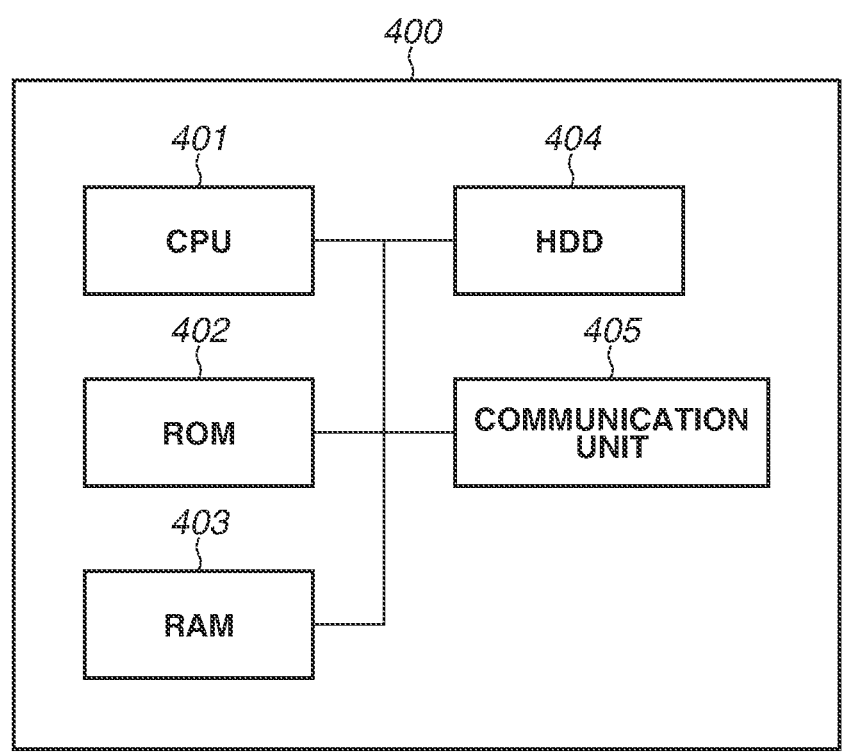
FIG. 4 is a block diagram illustrating an example of a hardware configuration of a virtual space server.

FIG. 4 illustrates an example of a hardware configuration of the virtual space server 400. A CPU 401 is an arithmetic circuit, loads programs stored in a ROM 402 or an HDD 404 into a RAM 403, and executes various kinds of processing. The ROM 402 stores programs including a system program to be used for control of user management and content management processed by the virtual space server 400. The virtual space server 400 provides a service (e.g., an online meeting service, a chat service, or a social networking service (SNS)) for sharing information in a virtual space. In the service, a virtual space is provided for each user or group. The HDD 404 has a function as a storage area, and stores programs including application programs for executing various kinds of processing. The HDD 404 is an example of a storage device, and an SSD can be used instead. A communication unit 405 is an interface for connecting various devices to each application. The communication unit 405 communicates with the PC 500, the HMD 300, and the MFP 200 via the network 100 under control of the CPU 401. An application for providing a service that enables a plurality of users to exchange information in a virtual space based on VR technology is installed on the HDD 404. A client application of the service is also installed on each of the storage 304 of the HMD 300, the storage 204 of the MFP 200, and a storage of the PC 500.

In the present exemplary embodiment, an example will be described in which the MFP 200 uploads (posts) image data generated by a scan to a virtual space of an online meeting service, which is an example of the service that enables a plurality of users to exchange information in a virtual space based on VR technology.

Figure 5:
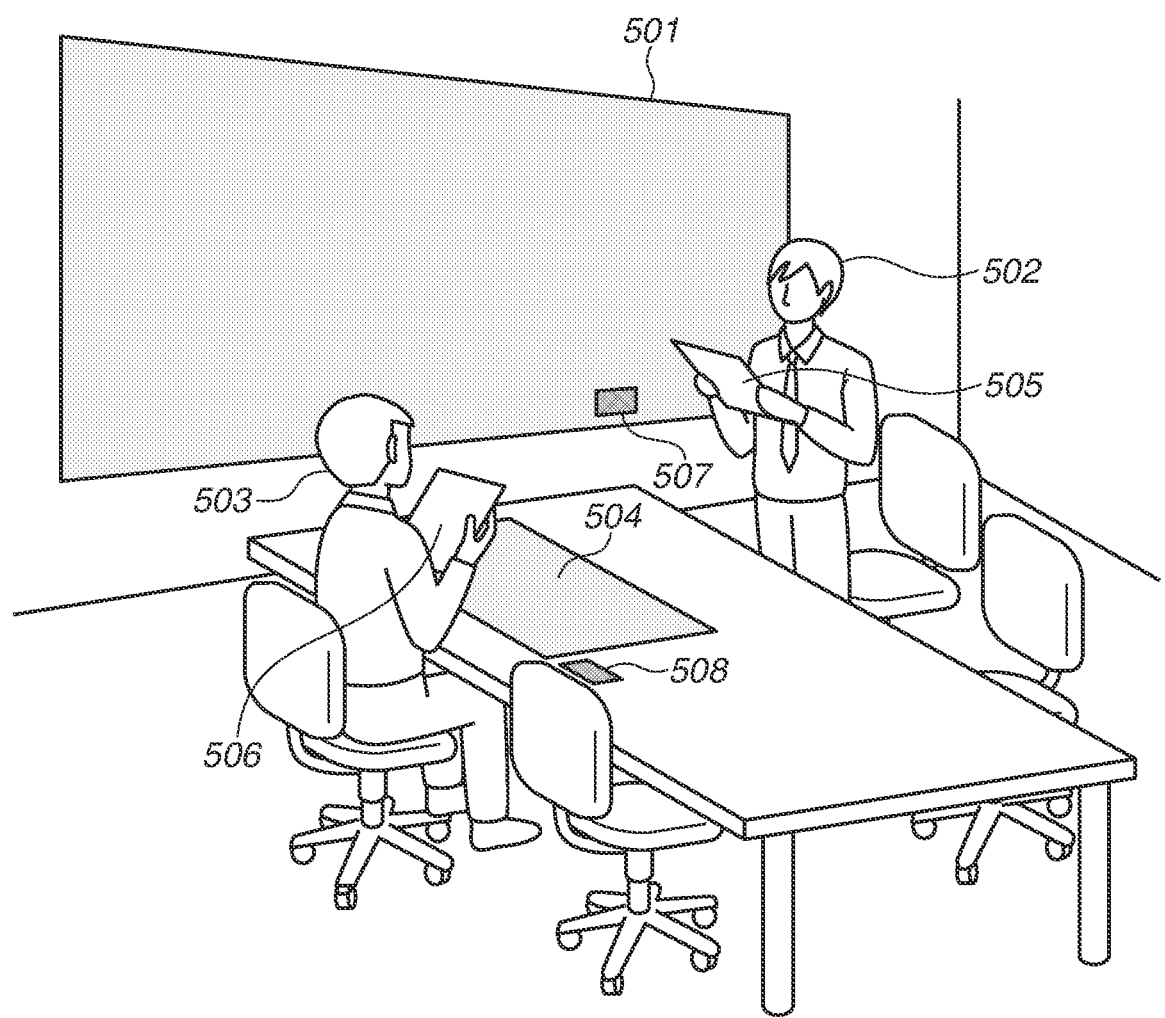
FIG. 5 is a diagram illustrating an example of a virtual space of an online meeting service.

FIG. 5 illustrates an example of the virtual space of the online meeting service. The virtual space illustrated in FIG. 5 is a space that a user wearing the HMD 300 can recognize by watching a video image displayed on the display unit 306.

An avatar 503 is an object representing a character of a certain user in the virtual space of the user wearing the HMD 300. An avatar 502 is an avatar of another user participating in an online meeting in the same virtual space. The users can freely write text and pictures on a white board 501 in a manner similar to writing on a white board in the real world. It is also possible to insert an image of image data into the white board 501. The white board 501 can be a blackboard or any other type of object as long as the object enables the users to share images and text.

A white board (hereinafter referred to as a desktop white board) 504 on which all or part of the white board 501 is reproduced is arranged near the seat of the avatar 503. To write on the white board 501, the avatar 503 can move to the white board 501 and directly write on the white board 501, or can write on the desktop white board 504 and reflect the written contents in the white board 501. When the user corresponding to the avatar 503 moves in the real world while wearing the HMD 300, the avatar 503 moves in the virtual space in an interlocking manner.

Image data can be captured in the online meeting in the virtual space. For example, using the PC 500, a user transmits image data stored in the PC 500 to the virtual space server 400 via a portal site provided by the virtual space server 400, so that the image data can be uploaded to the virtual space server 400. The uploaded image data is displayed when a user inputs a display instruction in the virtual space illustrated in FIG. 5A by performing an operation via the HMD 300 or by operating a controller (not illustrated) connected to the HMD 300. Instead of being input in the virtual space, the display instruction can be input on the portal site provided by the virtual space server 400.

Objects 505 and 506 displayed in the hands of the avatar 502 and in the hands of the avatar 503, respectively, are examples of an object for displaying the image data captured in the virtual space. A user can move the position of the object or change the size of the object by operating the controller (not illustrated). In other words, the displayed image data can be enlarged or reduced.

It is also possible to write on the objects 505 and 506 in a manner similar to writing on the white board 501. The image data is the data uploaded to the virtual space.

When an icon 507 on the white board 501 or an icon 508 near the desktop white board 504 is selected by a user, a menu is displayed.

The menu is related to functions for transmitting a scan instruction to the MFP 200 associated with the online meeting to which an instruction for a scan process is input. The icons 507 and 508 may not be constantly displayed, and can be displayed in response to an operation on the controller (not illustrated) or a gesture of a user.

FIG. 6 illustrates an example of a sequence of pull scan processing to be executed from the virtual space based on VR technology.

An online meeting application for providing the online meeting service in the virtual space based on VR technology is installed on the virtual space server 400. The CPU 401 of the virtual space server 400 executes the online meeting application. A pull scan application is also installed on the virtual space server 400, and the CPU 401 of the virtual space server 400 executes the pull scan application. The pull scan application is provided by the vendor of the MFP 200 and is stored in the HDD 404 of the virtual space server 400.

In step S601, a user inputs an instruction to activate the pull scan application by operating the avatar 502 or 503 to press the icon 507 or 508 in the virtual space in FIG. 5 via the HMD 300, or by operating the controller (not illustrated).

In step S602, the CPU 401 activates the pull scan application and provides, to the online meeting application, room information about a room of the virtual space in which the activation instruction has been input, and an instruction to generate a transmission destination Uniform Resource Locator (URL).

In step S603, the CPU 401 executes the online meeting application and generates, based on the room information, the transmission destination URL as a transmission destination of image data generated by a scan.

In step S604, the CPU 401 provides the generated URL to the pull scan application.

Figure 13:
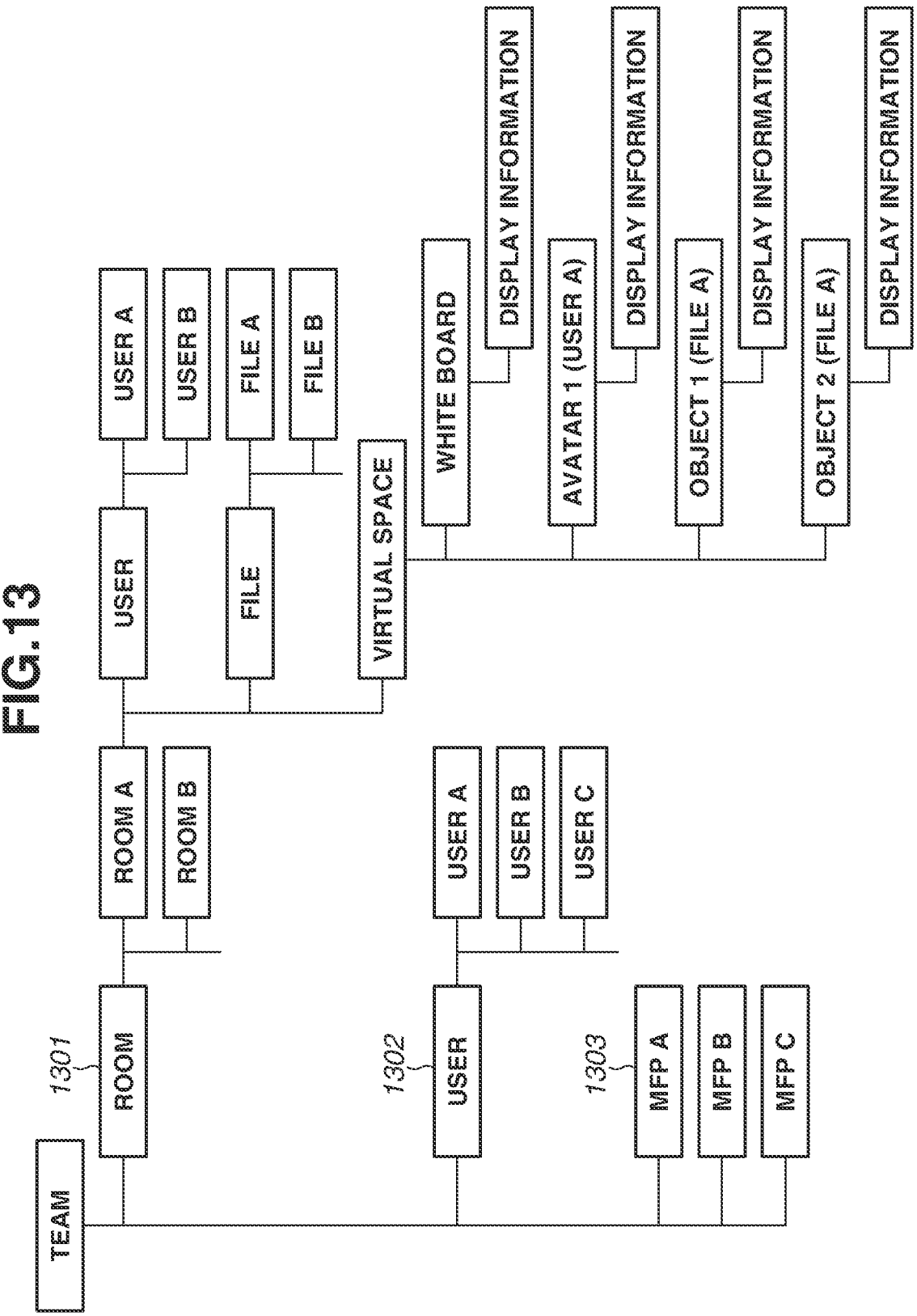
FIG. 13 is a diagram illustrating an example of a file structure of the virtual space server.

In the present exemplary embodiment, the room is a group managed by the online meeting service, and is similar to an organization to which a plurality of users, such as those illustrated in FIG. 13, belong. A virtual space such as that illustrated in FIG. 5 is associated with each room. A plurality of rooms can be associated with a team and can be used separately in the same team depending on the topic or role. A plurality of users participating in a room is associated with the room, and any user other than the associated plurality of users can be prevented from participating in the room.

A plurality of users participating in a room and a virtual space corresponding to the room are associated with each other. The room can be information indicating the virtual space (e.g., a name or an identifier (ID) of the virtual space), and the virtual space and the plurality of users can be directly associated with each other. Further, a plurality of virtual spaces can be associated with a room. In this case, after selection of the room as a posting destination is accepted via the operation unit 205 of the MFP 200, a list of pieces of identification information, such as the IDs or names of virtual spaces corresponding to the room, can be displayed, and selection of a virtual space can be accepted from a user. Subsequently, the MFP 200 can transmit, to the virtual space server 400, an instruction to display the image of the image data in the selected virtual space, so that the image of the image data transmitted from the MFP 200 is displayed in the selected virtual space. The identification information about virtual spaces displayed on the operation unit 205 is received by the MFP 200 from the virtual space server 400, as with identification information about rooms.

In addition, a plurality of objects is associated with a virtual space. For example, objects such as a white board, an avatar corresponding to a user, a table, and a chair are associated with the virtual space.

In step S605, the CPU 401 executes the pull scan application and requests the online meeting application to provide an available MFP list. Available MFPs 200 are those associated with the team to which the room corresponding to the instruction input in step S601 belongs. The MFPs 200 can be associated with the room instead of the team. In this case, the MFPs 200 associated with the room corresponding to the instruction input in step S601 are the available MFPs 200. The available MFP list can be registered in the pull scan application beforehand.

In step S606, the CPU 401 executes the online meeting application and acquires the available MFP list based on the room information accepted from the pull scan application in step S602. In step S607, the CPU 401 executes the online meeting application and provides the available MFP list to the pull scan application.

In step S608, the CPU 401 executes the pull scan application, generates screen information for displaying the available MFP list acquired in step S607, and transmits the generated screen information to the HMD 300.

In step S609, the HMD 300 displays an MFP selection screen based on the screen information received in step S608, and the HMD 300 accepts selection of one MFP 200 from the user. The HMD 300 then transmits information about the selected MFP 200 to the virtual space server 400.

Figure 8A:
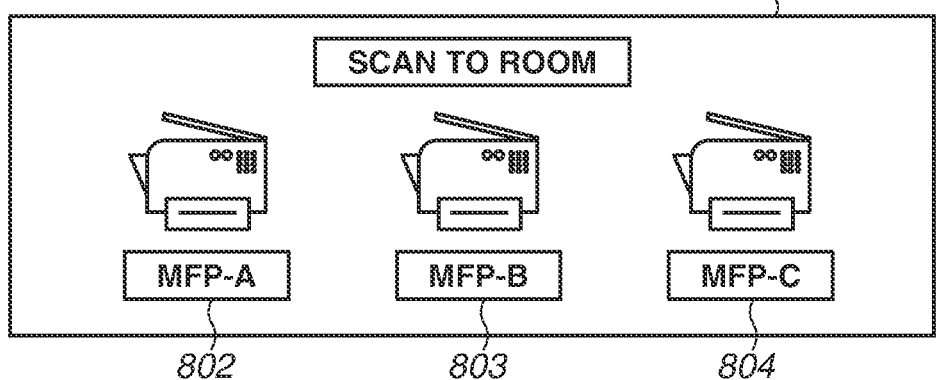
FIGS. 8A to 8C are diagrams illustrating an example of a screen transition of the pull scan application.

An MFP selection screen 801 illustrated in FIG. 8A is the screen displayed by the HMD 300 in step S609. In the example of FIG. 8A, three MFPs 200, namely, an MFP-A 802, an MFP-B 803, and an MFP-C 804 are displayed as the available MFPs 200. In a case where there is only one available MFP 200, displaying the MFP selection screen 801 can be omitted.

When one MFP 200 is selected for a scan in the MFP selection screen 801 and identification information about the selected MFP 200 is transmitted to the virtual space server 400, then in step S610, the CPU 401 executes the pull scan application and generates screen information about settings screens, and the CPU 401 transmits the generated screen information to the HMD 300. The screen information about the settings screens can be transmitted together with the available MFP list in step S608, and both of the settings and the selection of one MFP 200 can be accepted in the same screen.

Figure 8B:
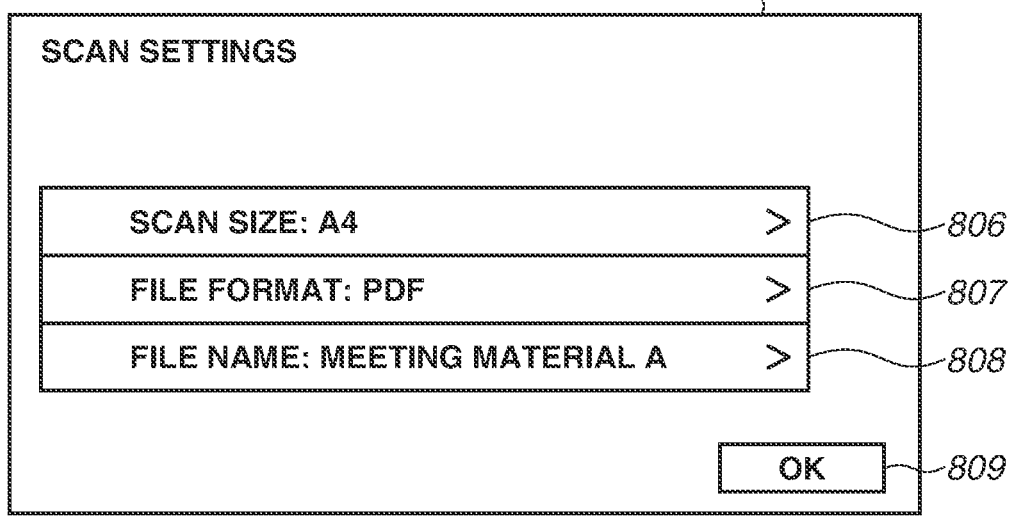

A scan settings screen 805 illustrated in FIG. 8B is a screen to be displayed on the HMD 300 based on the screen information received by the HMD 300 from the virtual space server 400 in step S610. The scan settings screen 805 is used to accept scan settings. The scan settings screen 805 includes a scan size button 806, a file format button 807, a file name button 808, and an OK button 809.

When the scan size button 806 is selected, options for setting a scan size to be used in scan processing by the MFP 200 selected from the list are additionally displayed. Examples of the options include A3, A4, and A5. The user can select a desired scan size from among the options.

When the file format button 807 is selected, options for selecting a file format of a file to be generated by the scan processing by the MFP 200 are displayed. Examples of the options include Joint Photographic Experts Group (JPEG), Tag Image File Format (TIFF), and Portable Document Format (PDF). The user can select a desired file format from among the options.

When the file name button 808 is selected, an object for entering a file name of the file to be generated by the scan processing by the MFP 200 is displayed. For example, a software keyboard can be displayed in the virtual space so that the user can enter the file name using the keyboard. A scan resolution setting can also be enabled as another setting. When the OK button 809 is selected, the settings made using the scan size button 806, the file format button 807, and the file name button 808 are finalized.

Figure 8C:
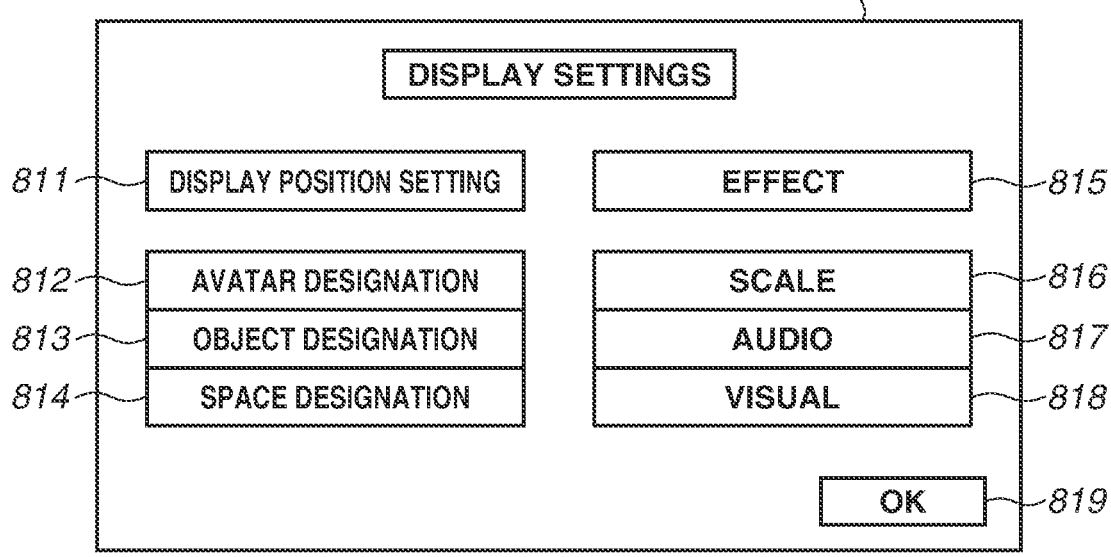

A display settings screen 810 illustrated in FIG. 8C is displayed when the OK button 809 is selected. The display settings screen 810 is used to accept display settings for displaying the file (hereinafter referred to as the scan data) generated in the scan processing by the MFP 200.

The display settings screen 810 includes a display position setting button 811, an avatar designation button 812, an object designation button 813, a space designation button 814, an effect button 815, a scale button 816, an audio button 817, a visual button 818, and an OK button 819.

When the display position setting button 811 is selected, the avatar designation button 812, the object designation button 813, and the space designation button 814 are displayed in order to designate a position where the scan data is to be displayed.

When the avatar designation button 812 is selected, an avatar selection screen 901 illustrated in FIG. 9A is displayed on the HMD 300. In the avatar selection screen 901, a list of users (avatars) participating in or associated with the room of the online meeting service in which the user using the HMD 300 participates is displayed. For example, when an avatar A is selected in the avatar selection screen 901, the scan data is displayed in association with the avatar A in the virtual space of the online meeting service. More specifically, the object of the scan data is displayed on the hands or eye level of the avatar A, or on the desktop white board 504 of the avatar A. Selecting whether to display the scan data on the hands, the eye level, or the desktop white board 504 of an avatar can be enabled after the selection of the avatar. When an OK button 902 is selected, the setting of the avatar is finalized. In a case where a plurality of avatars is selected in the avatar selection screen 901, the object of the scan data is displayed in association with the plurality of avatars.

When the object designation button 813 is selected, an object selection screen 903 illustrated in FIG. 9B is displayed on the HMD 300. In the object selection screen 903, a list of objects associated with the room of the online meeting service in which the user using the HMD 300 participates is displayed. For example, when "WHITE BOARD" is selected, the scan data is displayed on the white board 501 in the virtual space illustrated in FIG. 5. When a plurality of objects is selected in the object selection screen 903, the scan data is displayed on the plurality of objects. When an OK button 904 is selected, the setting of the object is finalized.

When the space designation button 814 is selected, a space selection screen 905 illustrated in FIG. 9C is displayed on the HMD 300. In the space selection screen 905, a list of positions in the virtual space for the online meeting in which the user using the HMD 300 participates is displayed. For example, when "CENTER OF MEETING ROOM" is selected, the scan data is displayed at the center of the virtual space for the online meeting. Alternatively, in the space selection screen 905, input of the numeric values of coordinates (x,z) in the virtual space can be accepted, or designation of an area by the controller or the like can be accepted. Moreover, the coordinates (x,y,z) of an area can be accepted.

When an OK button 906 is selected, the setting of the space is finalized.

When the scale button 816 is selected, a scale setting screen 1001 illustrated in FIG. 10A is displayed on the HMD 300. In the scale setting screen 1001, options for the display scale of the object of the scan data are displayed. For example, when "AUTO" is selected, the object is adjusted to a size that makes it easy for the user to visually recognize, based on the contents of the image to be displayed. For example, in a case where the scan data is a file (image data) generated by scanning a text-rich document, the object is displayed at a scale greater than the actual scale of the document. For example, in a case where the scan data is a file generated by scanning a picture-rich document, the object is displayed at the actual scale of the document. When an OK button 1002 is selected, the scale setting is finalized.

When the audio button 817 is selected, an audio setting screen 1003 illustrated in FIG. 10B is displayed on the HMD 300. In the audio setting screen 1003, a setting for providing a sound or voice notification when objects including the scan data are displayed (uploaded) can be accepted. For example, selection of the type of sound, designation of a sound volume, and designation of a notification target avatar (user) can be accepted. Candidates for the notification target avatar (user) are the same as the avatars (users) displayed in the avatar selection screen 901. The user (avatar) who has provided the scan instruction using the pull scan application can be notified even if selection of a notification destination avatar is not accepted. The user can enable or disable the notification by selecting a button 1004. When an OK button 1005 is selected, the setting of the notification is finalized.

When the visual button 818 is selected, a visual effect setting screen 1006 illustrated in FIG. 10C is displayed on the HMD 300. The visual effect setting screen 1006 is used to select motion in displaying the object of the scan data. For example, "SLIDE IN", "ZOOM", or "TURN" can be selected. The user can enable or disable the visual effect by selecting a button 1007. When an OK button 1008 is selected, the setting of the visual effect is finalized.

FIG. 11 illustrates an example of a confirmation window 1101. When the OK button 819 is selected in the display settings screen 810, the confirmation window 1101 for confirming the settings made in the scan settings screen 805, the display settings screen 810, and the like is displayed on the HMD 300. When an execute button 1102 is selected, the scan processing and object display processing are executed based on the contents displayed in the confirmation window 1101. When a cancel button 1103 is selected, the processing is canceled.

The example in which the screens including setting items are displayed in the virtual space of the online meeting service has been described with reference to FIGS. 8A to 11, but some embodiments are not limited thereto. For example, each button can be displayed as an independent object in the virtual space of the online meeting service.

In the present exemplary embodiment, the example in which the display settings for the object corresponding to the image data are accepted before the MFP 200 executes the scan processing to generate the image data has been described, but some embodiments are not limited thereto. For example, only the scan settings can be accepted before the scan processing, and after the image data generated by the scan processing is uploaded to the virtual space server 400, the position at which the object of the image data is to be displayed can be accepted. The object can be displayed in the virtual space when an instruction to display the object is accepted afterward.

Now, return to the description of FIG. 6. In step S611, when the execute button 1102 of the confirmation window 1101 is selected, the HMD 300 transmits setting information indicating the finalized settings to the pull scan application of the virtual space server 400. In step S612, the CPU 401 stores the received setting information.

In step S613, the HMD 300 transmits a scan execution instruction to the pull scan application of the virtual space server 400.

In step S614, the CPU 401 executes the pull scan application and transmits the scan execution instruction, the setting information, and the transmission destination URL to the MFP 200 selected in step S609.

In step S615, the CPU 201 of the MFP 200 controls the scanning unit 207 to execute the scan processing of scanning an image of a document. In step S616, the CPU 201 generates image data. The scan processing executed at this time is based on the scan settings included in the setting information received in step S614. The scan processing can be automatically executed after the scan execution instruction is received in step S614 (without accepting an operation from the user via the operation unit 205 after receiving the scan execution instruction). The scan execution instruction, the setting information, and the transmission destination URL can be stored in the storage 204 as a scan job. A list of scan jobs stored in the storage 204 can be displayed on the operation unit 205, and the scan processing can be executed in response to accepting a selection and an execution instruction from the user. The document to be scanned in the scan processing can include a plurality of sheets or one sheet.

For example, in the case of a plurality of sheets of a document, a document bundle placed in the ADF is collectively scanned.

In step S617, the CPU 201 notifies the pull scan application of the virtual space server 400 about the result of the scan processing executed in step S615. More specifically, the pull scan application is notified of successful completion of the scan processing or occurrence of an error.

In step S618, the CPU 201 transmits the image data (the file) generated in step S616 to the transmission destination URL. The transmission destination URL is a URL for uploading data to a specific room of the online meeting service provided by the online meeting application of the virtual space server 400. In other words, the image data (the file) generated in step S616 is transmitted to the online meeting application of the virtual space server 400. The specific room can be the room for which the instruction in step S601 is accepted, or can be a room separately set by the pull scan application. The transmission destination URL can indicate a plurality of rooms designated by the user via the HMD 300.

In step S619, the CPU 401 executes the online meeting application and stores the image data transmitted in step S618 into the HDD 404. The image data is stored in association with the room indicated by the transmission destination URL. This enables only users participating in (associated with) the room to refer to the image data.

In step S620, the CPU 401 executes the online meeting application and transmits, to the pull scan application, a storage notification indicating completion of the storage of the image data and the file ID of the image data.

In step S621, the CPU 401 executes the pull scan application and transmits, to the online meeting application, a display instruction, the file ID of the image data to be displayed, and the setting information indicating the display settings made in step S611. The display instruction can be automatically transmitted to the online meeting application in response to acceptance of the storage notification by the pull scan application in step S620 (without accepting an instruction from the user via the HMD 300), but some embodiments are not limited thereto. For example, the processing in step S621 can be executed in response to accepting, via the HMD 300, selection of desired image data to be displayed from the user after the pull scan application accepts the storage notification and the file ID in step S620. In this case, the file ID transmitted in step S621 is the file ID of the image data selected by the user. The pull scan application can accept the display settings via the HMD 300 when the image data is selected.

In step S622, the CPU 401 executes the online meeting application and generates an object for displaying, in the virtual space, the image data for which the display instruction has been provided. The object generated at this time is an object generated based on the display settings made by the user.

In step S623, the CPU 401 executes the online meeting application and renders the generated object in the virtual space. This enables the user to view, via the HMD 300, the object of the image data generated by the scan processing. The position of the object displayed in the virtual space is a position based on the display settings made by the user.

Figure 12:
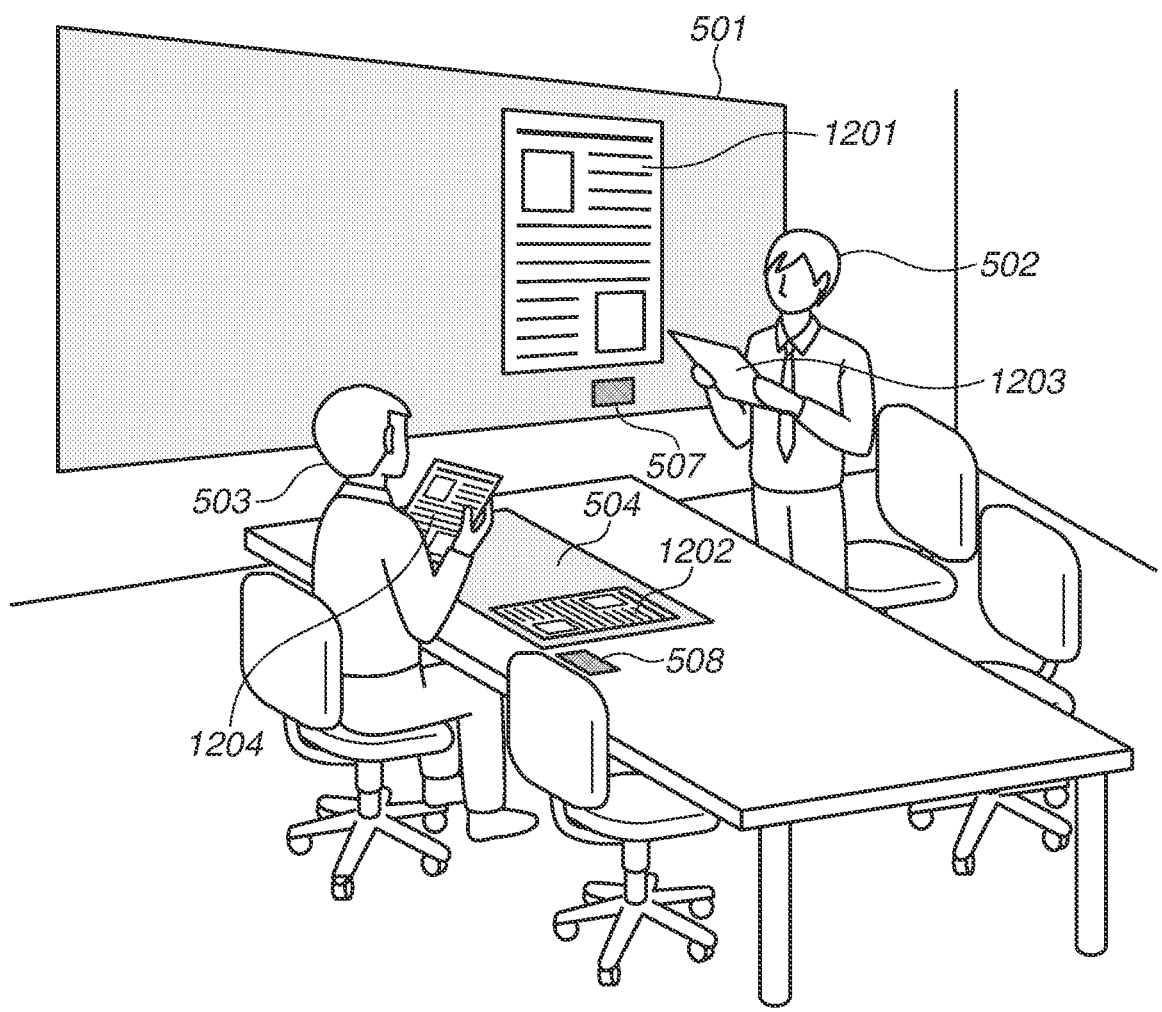
FIG. 12 is a diagram illustrating an example of a virtual space to which image data generated by a scan is posted.

FIG. 12 illustrates an example of the virtual space to which the image data generated by the scan processing is posted. This example is displayed in a case where the avatars 502 and 503 are selected in the avatar selection screen 901 illustrated in FIG. 9A, the white board 501 and the desktop white board 504 are selected in the object selection screen 903 illustrated in FIG. 9B, and "AUTO" is set in the scale setting screen 1001 illustrated in FIG. 10A. Objects 1201 and 1202 of the scan data are displayed on the white board 501 and the desktop white board 504, respectively. In a case where the avatars 502 and 503 are selected as the object display positions, the avatars 502 and 503 can respectively move objects 1203 and 1204 of the scan data while holding the objects 1203 and 1204 with the hands in the virtual space as illustrated in FIG. 12. This enables the user to bring the object closer to the avatar of the user and display the object in an enlarged manner in the case of small text.

FIG. 7 is a flowchart illustrating an example of the processing by the pull scan application. In the present exemplary embodiment, in the processing by the pull scan application, the HMD 300 and the virtual space server 400 operate in cooperation with each other. The CPU 401 loads computer-executable instructions stored in the ROM 402 into the RAM 403 to execute the flowchart in FIG. 7. The flowchart in FIG. 7 is executed when the user selects the icon 507 or 508.

In step S701, the CPU 401 activates the pull scan application. In step S702, the CPU 401 executes the pull scan application and instructs the online meeting application to generate a transmission destination URL.

In step S703, the CPU 401 executes the pull scan application and receives, from the online meeting application, a notification as to whether the generation of the URL is successful, and determines whether the generation of the URL is successful. In a case where the CPU 401 determines that the generation of the URL is successful (YES in step S703), the processing proceeds to step S704. In a case where the CPU 401 determines that the generation of the URL fails (NO in step S703), the processing proceeds to step S719.

In step S719, the CPU 401 executes the pull scan application and displays, on the HMD 300, error information indicating the failure of the generation of the URL.

In step S704, the CPU 401 executes the pull scan application and acquires the transmission destination URL generated by the online meeting application.

In step S705, the CPU 401 executes the pull scan application and acquires an available MFP list.

In step S706, the CPU 401 executes the pull scan application and determines whether the available MFP list is successfully acquired. In a case where the CPU 401 determines that the available MFP list is successfully acquired (YES in step S706), the processing proceeds to step S707.

In a case where the CPU 401 determines that the available MFP list fails to be acquired (NO in step S706), the processing proceeds to step S720.

In step S720, the CPU 401 executes the pull scan application and displays, on the HMD 300, error information indicating the failure of the acquisition of the MFP list.

In step S707, the CPU 401 executes the pull scan application and determines whether the number of MFPs 200 included in the acquired MFP list is more than one. In a case where the CPU 401 determines that the number of MFPs 200 in the acquired MFP list is one (NO in step S707), the processing proceeds to step S710. In a case where the CPU 401 determines that the number of MFPs 200 in the acquired MFP list is more than one (YES in step S707), the processing proceeds to step S708.

In step S708, the CPU 401 executes the pull scan application, generates screen information for displaying the MFP selection screen 801 on the HMD 300, and transmits the generated screen information to the HMD 300.

In step S709, the CPU 401 executes the pull scan application and accepts selection of one MFP 200 via the HMD 300.

In step S710, the CPU 401 executes the pull scan application and sets the MFP 200 selected in step S709 as the MFP 200 that is to execute the scan processing.

In step S711, the CPU 401 executes the pull scan application, generates screen information for displaying the scan settings screen 805 on the HMD 300, and transmits the generated screen information to the HMD 300.

In step S712, the CPU 401 executes the pull scan application and accepts scan settings via the HMD 300.

In step S713, the CPU 401 executes the pull scan application, generates screen information for displaying the display settings screen 810 on the HMD 300, and transmits the generated screen information to the HMD 300.

In step S714, the CPU 401 executes the pull scan application and accepts display settings via the HMD 300.

In step S715, in response to selection of the execute button 1102 illustrated in FIG. 11, the CPU 401 executes the pull scan application and transmits a scan execution instruction and various kinds of setting information to the selected MFP 200. Connection information (e.g., an Internet Protocol (IP) address) for communicating with the selected MFP 200 is preregistered in the pull scan application or the online meeting application. In a case where the connection information for communicating with the selected MFP 200 is preregistered in the online meeting application, the scan execution instruction is transmitted to the MFP 200 via the online meeting application.

In step S716, the CPU 401 executes the pull scan application and determines whether the scan processing is successful based on a scan result notification received from the MFP 200. In a case where the CPU 401 determines that the scan processing is successful (YES in step S716), the processing proceeds to step S717. In a case where the CPU 401 determines that the scan processing fails (NO in step S716), the processing proceeds to step S721.

In step S717, the CPU 401 executes the pull scan application and accepts a storage notification indicating that the image data generated by the scan processing is stored.

In step S718, the CPU 401 executes the pull scan application and transmits a display instruction for displaying the image data to the online meeting application.

In step S721, the CPU 401 executes the pull scan application and displays, on the HMD 300, error information indicating the failure of the scan processing by the MFP 200. The error information can include the cause of the failure of the scan processing. For example, the error information can include information indicating that the execution of the scan processing has failed because no document is placed on the scanning unit 207. The error information can also include information that prompts the user to place a document on the scanning unit 207.

FIG. 13 illustrates an example of a file structure of the virtual space server 400. The file structure is stored in the HDD 404 of the virtual space server 400. The file structure has groups such as "Room" and "User" in the largest group referred to as "Team", and the virtual space server 400 manages the data. A room 1301 is a group created in a team in order to discuss a collection of certain topics. Members participating in a room can have discussion using a chat or virtual space associated with the room. A room is created by a user of the team and, for example, a user A and a user B participate in a room A. In addition, a member can be added to the room A by an invitation. A user 1302 includes the user A, the user B, and a user C participating in the team. MFPs 1303 (MFP A, MFP B, and MFP C) are associated with the team. Alternatively, the MFPs 1303 can be associated with each room.

A virtual space like the example illustrated in FIG. 5 is prepared for each room, and members participating in the room can enter the room. Various objects associated with the virtual space, such as those representing a white board, an avatar, and an image file, are displayed in the virtual space, and each of the objects has display information for displaying the object, such as the three-dimensional coordinates and size of the object. In addition, a file posted to the room is stored in association with the room, and can be captured in the virtual space by a user operation and displayed as an object. The example in which a virtual space is associated with a room has been described above with reference to FIG. 13, but objects, such as a white board, can be directly associated with the room. In this case, the room is also treated as the virtual space.

In the virtual space, a plurality of objects based on the same file can be displayed. This enables users at different positions in the virtual space to view the same file at the same time.

A file such as image data or text data is also associated with the room.

The file associated with the room can be displayed in the virtual space when a user provides a display instruction via the HMD 300 in the virtual space.

Executing the above-described processing makes it possible to reduce time and effort of a user in posting, on a service for sharing information in a virtual space, image data generated by a scan.

An exemplary embodiment of the present disclosure can also be implemented by the following processing. Computer-executable instructions for implementing one or more functions according to the above-described exemplary embodiment are supplied to a system or an apparatus via a network or a storage medium. One or more processors in a computer of the system or the apparatus then read and execute the computer-executable instructions. An exemplary embodiment of the present disclosure can also be implemented by a circuit (e.g., an ASIC) for implementing the one or more functions.

Other Embodiments

Some embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2022-124675, which was filed on Aug. 4, 2022 and which is hereby incorporated by reference herein in its entirety.

What is claimed is:

1. An information processing method comprising:
performing first transmission to transmit identification information of a virtual space to a scanning apparatus based on a scan instruction input in the virtual space;
scanning a document to generate image data;
performing second transmission to transmit the identification information and the generated image data to an information processing apparatus that provides a service for sharing information in the virtual space; and
executing processing for displaying an object based on the transmitted image data in the virtual space corresponding to the identification information transmitted in the second transmission.

2. The information processing method according to claim 1, further comprising accepting a scan setting in the virtual space,
wherein the identification information and the scan setting are transmitted to the scanning apparatus in the first transmission, and the document is scanned based on the scan setting to generate the image data.

3. The information processing method according to claim 2, wherein the scan setting includes a file format setting.

4. The information processing method according to claim 1, further comprising accepting a display position setting in the virtual space,
wherein the processing for displaying the object is executed based on the accepted display position setting.

5. The information processing method according to claim 4, wherein designation of an avatar in the virtual space is accepted as the display position setting for the object.

6. The information processing method according to claim 4, wherein designation of a white board in the virtual space is accepted as the display position setting for the object.

7. The information processing method according to claim 4, wherein designation of coordinates in the virtual space is accepted as the display position setting for the object.

8. The information processing method according to claim 1, wherein the service is an online meeting service that enables a plurality of users in the virtual space to share information.

9. A scanning apparatus communicable with an information processing apparatus that provides a service for sharing information in a virtual space, the scanning apparatus comprising:
a scanning unit configured to scan a document to generate image data;
one or more memories; and
one or more processors, wherein the one or more processors and the one or more memories are configured to:
perform control to receive identification information of the virtual space that is transmitted based on a scan instruction input in the virtual space; and
perform control to transmit the identification information and the generated image data to the information processing apparatus,
wherein an object based on the transmitted image data is displayed in the virtual space corresponding to the identification information.

10. The scanning apparatus according to claim 9,
wherein the one or more processors and the one or more memories are further configured to perform control to receive a scan setting made in the virtual space, and
wherein the scanning unit scans the document based on the received scan setting to generate the image data.

11. The scanning apparatus according to claim 10, wherein the scan setting includes a file format setting.

12. The scanning apparatus according to claim 10, wherein the one or more processors and the one or more memories are further configured to perform control to receive the identification information and the scan setting from the information processing apparatus.

13. The scanning apparatus according to claim 9, wherein the service is an online meeting service that enables a plurality of users in the virtual space to share information.

14. The scanning apparatus according to claim 9, wherein the scanning unit includes a document tray, and generates the image data by conveying a plurality of sheets of the document placed in the document tray and scanning the conveyed plurality of sheets.

15. One or more non-transitory computer-readable media storing instructions that, when executed by one or more computers, cause the one or more computers to perform operations that comprise:
performing first transmission to transmit identification information of a virtual space to a scanning apparatus based on a scan instruction input in the virtual space;
scanning a document to generate image data;
performing second transmission to transmit the identification information and the generated image data to an information processing apparatus that provides a service for sharing information in the virtual space; and
executing processing for displaying an object based on the transmitted image data in the virtual space corresponding to the identification information transmitted in the second transmission.

\* \* \* \* \*